United States Patent
Beard

(10) Patent No.: US 9,906,265 B1
(45) Date of Patent: Feb. 27, 2018

(54) MANCHESTER CORRELATOR

(71) Applicant: uAvionix Corporation, Omaha, NE (US)

(72) Inventor: Paul Beard, Bigfork, MT (US)

(73) Assignee: uAvionix Corporation, Bigfork, MT (US)

( * ) Notice: Subject to any disclaimer, the term of this patent is extended or adjusted under 35 U.S.C. 154(b) by 0 days.

(21) Appl. No.: 15/290,708

(22) Filed: Oct. 11, 2016

Related U.S. Application Data

(60) Provisional application No. 62/242,082, filed on Oct. 15, 2015, provisional application No. 62/239,016, filed on Oct. 8, 2015, provisional application No. 62/242,182, filed on Oct. 15, 2015.

(51) Int. Cl.

| | |
|---|---|
| *H03D 1/00* | (2006.01) |
| *H04B 1/7093* | (2011.01) |
| *H04L 7/04* | (2006.01) |
| *H04L 27/26* | (2006.01) |
| *B64C 39/02* | (2006.01) |

(52) U.S. Cl.
CPC ......... *H04B 1/7093* (2013.01); *B64C 39/024* (2013.01); *H04L 7/042* (2013.01); *H04L 27/2644* (2013.01); *B64C 2201/122* (2013.01)

(58) Field of Classification Search
CPC ... H04L 7/042; H04L 27/2662; H04B 1/7093; H04B 7/18506; G01S 13/767; G01S 13/91

USPC .......... 375/343, 260, 333; 370/464
See application file for complete search history.

(56) References Cited

U.S. PATENT DOCUMENTS

| | | | |
|---|---|---|---|
| 5,475,705 A | 12/1995 | Dent | |
| 6,891,906 B1 * | 5/2005 | Sogabe | H03M 5/12 375/324 |
| 7,391,359 B2 | 6/2008 | Ootomo et al. | |
| 7,471,235 B2 | 12/2008 | Ootomo et al. | |
| 8,467,431 B2 | 6/2013 | Park et al. | |
| 9,250,320 B2 | 2/2016 | Watson et al. | |
| 2012/0001788 A1 | 1/2012 | Carlson et al. | |

* cited by examiner

*Primary Examiner* — Khai Tran
(74) *Attorney, Agent, or Firm* — Suiter Swantz pc llo

(57) ABSTRACT

A system, apparatus, and related method for receiving and correlating Manchester encoded data signals includes a receiver for receiving 1090ES/ADS-B or other Manchester encoded signals. A sampler extracts and oversamples data strings from the received signals. Sample correlators compare the oversampled data strings to oversampled versions of each possible pattern for the extracted data string and determine a score indicating how closely the possible pattern (or its oversampled counterpart) matches the extracted data string (or its oversampled version) on a bitwise or symbolwise basis. The system outputs correlated and decoded data string most closely matching the extracted data string based on the set of determined scores.

20 Claims, 4 Drawing Sheets

MANCHESTER CORRELATOR

CROSS-REFERENCE TO RELATED APPLICATIONS

This application claims priority under 35 U.S.C. § 119(e) to provisional U.S. Patent Applications: Ser. No. 62/239,016, filed Oct. 8, 2015; Ser. No. 62/242,082, filed Oct. 15, 2015; and Ser. No. 62/242,182, filed Oct. 15, 2015. Said provisional U.S. Patent Applications 62/239,016, 62/242,082, and 62/242,182 are herein incorporated by reference in their entirety.

TECHNICAL FIELD

The invention is generally related to decoding of encoded data and more particularly to a system and apparatus for receiving and decoding a Manchester-encoded data stream via a plurality of pattern matching pathways.

BACKGROUND

Communications standards may employ a phase encoding technique sometimes referred to as Manchester encoding. Manchester encoding is characterized by a line code in which the encoding of each individual data bit 1) always has a transition at its midpoint and 2) occupies a consistent time period from bit to bit. As a transition is ensured at least once every bit, the receiving device may easily recover clock and data. Manchester encoding has no direct current (DC) component and thus may be coupled inductively or capacitively. A typical application may require a Manchester data encoder for data transmission and a receiver on the other end for decoding the encoded transmission.

The information carried by Manchester encoded data may be indicated by the midpoint transition (low-to-high, or high-to-low). An encoded data bit may include a transition at the start of a period, but this transition does not carry data. The interpretation of the midpoint transition is not universally consistent. According to a first convention established by G. E. Thomas (which will subsequently be observed herein), a low-to high transition (also expressed as "01") may be interpreted as a logical zero (0) and a high-to-low transition (e.g., "10") may be interpreted as a logical one (1). The alternative IEEE 802.3 convention reverses this interpretation: the low-to-high transition 01 is interpreted as a logical 1 and the high-to-low transition 10 as a logical 0.

One exemplary communications standard may employ Manchester encoded data (MED) in the transmission of data from point to point. Automated dependent surveillance broadcast (ADS-B) signals may be one awareness tool usable by pilots as well as air traffic control (ATC) and ground personnel for each to maintain positional awareness of, and separation assurance from, the other. ADS-B Out provides ATC facilities and nearby aircraft with real-time position information. ADS-B In refers to an appropriately equipped aircraft's ability to receive and display another aircraft's ADS-B Out information as well as additional ADS-B In services provided by ground systems and ATC facilities, including Automatic Dependent Surveillance-Rebroadcast (ADS-R), Traffic Information Service-Broadcast (TIS-B), and, if so equipped, Flight Information Service-Broadcast (FIS-B).

One example of ADS-B Out may include transmission/reception via Extended Squitter (ES) at a frequency of 1090 MHz (1090ES) using Manchester encoding for data transmission. However, correlating a plurality of received Manchester encoded 1090ES signals may pose a challenge for operators. Therefore, a need remains for a system and related method capable of efficiently decoding a plurality of received signals of noisy MED and accurately correlating the data stream to the intended resultant data set.

SUMMARY

In a first aspect, embodiments of the inventive concepts disclosed herein may be directed to a system or apparatus for correlating Manchester-encoded data. The system may include a data radio for receiving 1090ES/ADS-B or other similar Manchester encoded data signals. The system may include samplers for extracting encoded data strings from the Manchester encoded data signals and oversampling the extracted data strings. The system may include a block of sample correlators, each sample correlator corresponding to a possible pattern or value of the extracted data strings. Each sample correlator may compare its unique possible pattern to the extracted data string, generating one or more scores characterizing the closeness of the match and forwarding the scores to a magnitude module. The magnitude module may determine which of the sample correlators most closely matches the extracted data string by a comparison of received scores. The system may include a position module for outputting a correlated and decoded data stream corresponding to the possible pattern of the sample correlator most closely matching the extracted data stream.

In a further aspect, embodiments of the inventive concepts disclosed herein may be directed to a method for receiving and correlating Manchester encoded data signals. The method may include receiving Manchester encoded data (MED) signals. The method may include extracting encoded data strings from the received MED signals. The method may include generating oversampled strings by oversampling the extracted data strings at a particular oversampling rate. The method may include generating oversampled patterns by oversampling each possible value of the extracted data string via a set of sample correlators. The method may include determining which possible value most closely matches the extracted data string by comparing each oversampled pattern to the oversampled string via the sample correlators and generating a match value. The method may include outputting a correlated, decoded data string corresponding to the possible value most closely matching the extracted data string.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
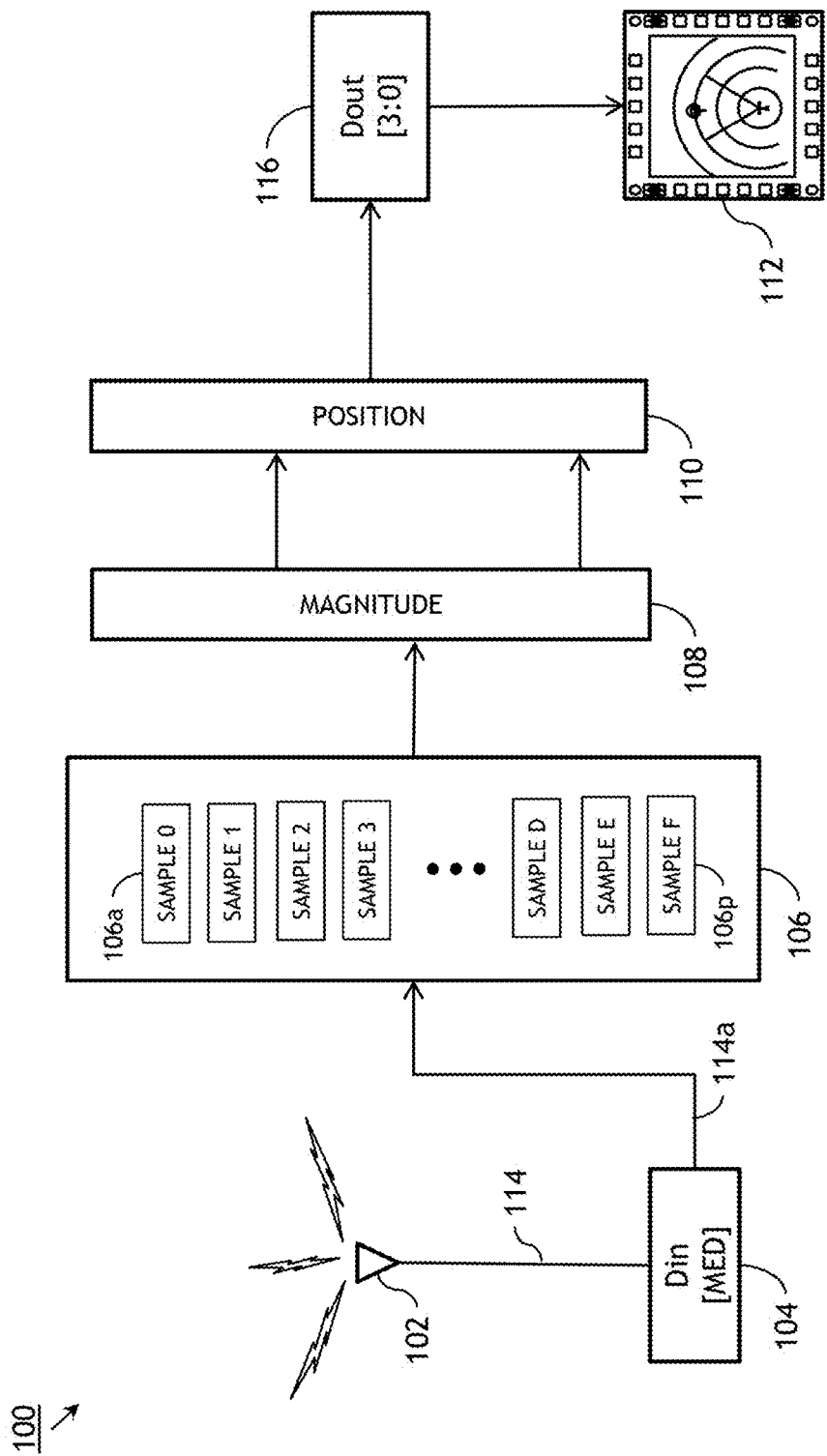
FIG. 1 is a schematic hardware diagram of an exemplary embodiment of a correlator in accordance with the inventive concepts disclosed herein.

Referring to FIG. 1, an exemplary embodiment of a system 100 for correlating Manchester encoded data streams according to the inventive concepts disclosed herein may include a data radio or similar receiver 102, a sampler 104, a correlator block 106 of sample correlators 106a-106p, a magnitude module 108, and a position module 110. The system 100 may be embodied in an ADS-B compatible receiver incorporated aboard a manned aircraft, or embodied in a compact ADS-B receiver aboard an unmanned aircraft system (UAS). The system 100 may output correlated and decoded data usable by other onboard control systems (112) of the manned aircraft or UAS (e.g., to provide separation assurance between the ownship and other proximate craft, manned or unmanned, in its airspace).

The receiver 102 may scan (through, e.g., omnidirectional and/or directional antenna elements) one or more available frequencies for 1090ES signals or similar examples of a Manchester-encoded data (MED) stream (114). For example, the receiver 102 may be an ADS-B compatible receiver programmed to scan at 1090 MHz for ADS-B Out or Mode-S transponder signals transmitted by nearby aircraft. The ADS-B receiver may receive the 1090ES MED stream 114 at −100 dBm and an onboard display (112) may be generated for the pilot and crew based on the correlated and decoded data output. An aircraft over Oklahoma City may enhance situational awareness and separation assurance both in the short term (with respect to aircraft in its vicinity) and the long term (with respect to aircraft whose flight paths may intersect with its own flight path) by receiving encoded 1090ES data from aircraft as distant as the Dallas metroplex (160 nm from the ownship position). The resulting output data may show the position of the second aircraft on an ADS-B traffic display of the first aircraft and track the progress of the second aircraft.

As the 1090ES MED stream may be propagated through high-traffic environments, over long distances, or through variable atmospheric conditions, the MED stream may be associated with high noise levels. The system 100 may facilitate extraction of output data from the MED stream while separating the desired output data from received noise. In addition, correlator codes may normally display both good cross-correlation and auto correlation properties. A MED string tends to repeat along its length, and thus Manchester coding may have undesirable auto-correlation properties. However, any drawbacks in these auto-correlation properties may be kept transparent to the system 100 by utilizing a separate, independent correlator to examine the preamble to the incoming MED stream 114 and set sampling and timing for the remainder of the stream.

In some embodiments, the sampler 104 of the system 100 may sample the incoming MED stream 114 (Din) in equivalent segments, e.g., four encoded bits at a time. For example, the sampled MED string (114a) of four encoded bits may be associated with $2^4=16$ (hexadecimal 0-F) possible values or patterns, e.g., data strings {0000, 0001, 0010, . . . 1110, 1111}. Only one of the 16 possible data strings may correspond to the correct output data. As previously noted, the four-bit MED string 114a may be represented as an eight-symbol equivalent string wherein each encoded bit corresponds to a high-low (10) or low-high (01) transition. However, there would remain $2^4$ or 16 possible values or patterns {01 01 01 01 (0000), 01 01 01 10 (0001), . . . 10 10 10 01 (1110), 10 10 10 10 (1111)}.

The extracted four-bit MED string 114a may be forwarded by the sampler 104 to a block of sample correlators 106, each individual sample correlator 106a-106p corresponding to one of the 16 (0-F) possible patterns, or possible values, of the four-bit MED string 114a (or the equivalent eight-symbol string). For example, the sample correlator 106a may correspond to the first possible pattern, or Pattern 0, of the four-bit MED string 114a (0000, or 01 01 01 01). Similarly, the sample correlator 106p may correspond to the last possible pattern, or Pattern F (1111, or 10 10 10 10). By comparing the four-bit MED string 114a to each possible pattern, the system 100 may create perfect gain and extract or isolate precise patterns of desired data from the potentially noisy MED stream 114. In some embodiments, the system 100 may sample the MED stream 114 in segments of other sizes, with the bank of sample correlators 106 corresponding to the set of possible patterns for the sample data stream.

Each sample correlator 106a-106b may individually assess how closely its assigned possible pattern matches the sampled MED string 114a, and present one or more scores corresponding to this assessment to the magnitude module 108. Based on the set of assessments and scores, the magnitude module 108 may determine which of the 16 possible patterns is the best match for the sampled MED string 114a and direct the position module 110 to output the corresponding correlated and decoded data (Dout) as a four-bit binary data string (116) for use or display by other onboard systems 112.

Figure 2:
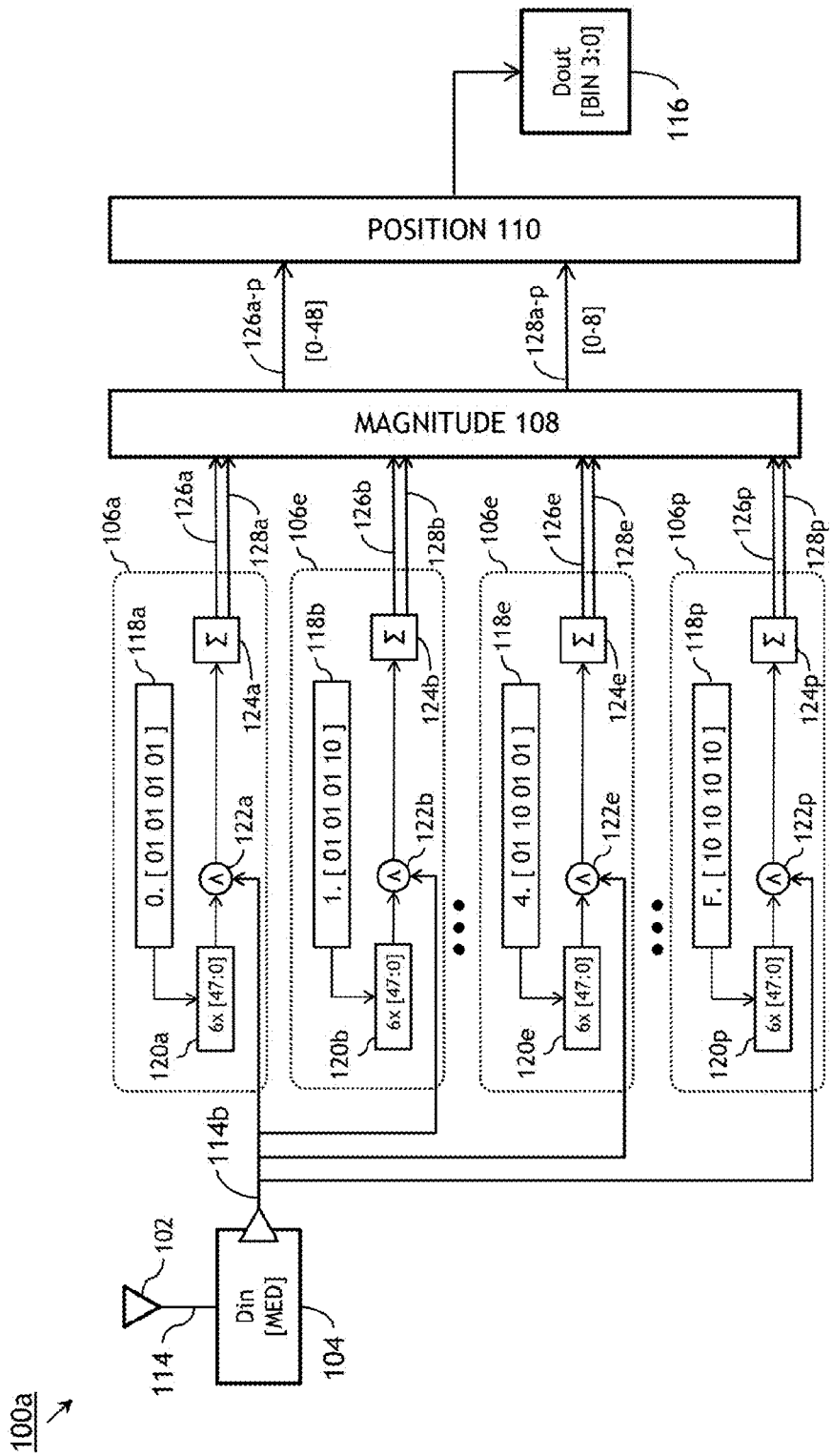
FIG. 2 is a detailed schematic hardware diagram of the correlator of FIG. 1.

Referring to FIG. 2, a system 100a may be implemented and may function similarly to the system 100 of FIG. 1, except that the incoming (Din) MED stream 114 of the system 100a may include raw baseband data received by the data radio 102. The sampler 104 may oversample the incoming MED stream 114 by a factor of 6, at 2 Msymbols/sec (12 MHz), such that the sampled 4-bit encoded data stream (114a, FIG. 1) or equivalent 8-symbol stream corresponds to a 48-symbol oversampled string (114b). The oversampled string 114b may be passed to each sample correlator 106a-106p. Each sample correlator 106a-106p may correspond to a possible pattern 118a-118p for the sampled 4-bit encoded data stream 114a (0000/01 01 01 01, 0001/01 01 01 10, . . . 1111/10 10 10 10) and may generate an oversampled pattern 120a-120p based on its assigned possible pattern 118a-118p. For example, the sample correlator 106a may correspond to possible pattern 118a (pattern 0, or 0000/01 01 01 01) which, at the 6× oversampled rate, becomes the oversampled pattern (120a):
000000 111111 000000 111111 000000 111111 000000 111111.

The oversampled patterns 120a-120p may reflect 4×, 6×, 8×, or any other appropriate oversampling rate selected by the sampler 104. Similarly, the sample correlator 106p may correspond to possible pattern 118p (pattern F, or 1111/10 10 10 10), which at the 6× oversampled rate becomes the oversampled pattern (120p):
111111 000000 111111 000000 111111 000000 111111 000000.

As noted above, there are $2^4$ or 16 possible patterns or values for the four-bit encoded MED stream 114a (FIG. 1). Similarly, only $2^4$ or 16 possible oversampled patterns 120a-120p (two of which, examples 120a and 120p, are provided above) are valid 48-symbol strings corresponding precisely to a possible pattern 118a-118p. However, the 48-symbol oversampled string 114b has $2^{48}$ possible patterns, or over 280 trillion. For a single bit of the four-bit encoded data stream 114a to be corrupted (e.g., from '0' to '1'), 12 consecutive samples in the oversampled string 114b must be corrupted (e.g., '000000 111111' to '111111 000000'). Accordingly, the minimum distance between valid codes, or cross-correlation (e.g., 0000/0001), would be 12 sample errors. However, still greater intermediate distances may be possible (e.g., a distance of 48 sample errors between 0000 and 1111, based on equivalent oversampled versions).

Each sample correlator 106a-106p may compare (122a-122p) the oversampled string 114b with its generated oversampled pattern (120a-120p), e.g., via 48-bit shift registers, exclusive OR (XOR) gates, or any other appropriate logical means. A summation module (124a-124p) may track the errors or matches between the oversampled string 114b and each oversampled pattern 120a-120p, outputting the resulting scores (bitwise match values 126a-126p, symbolwise match values 128a-128p) to the magnitude module 108.

Figure 3:
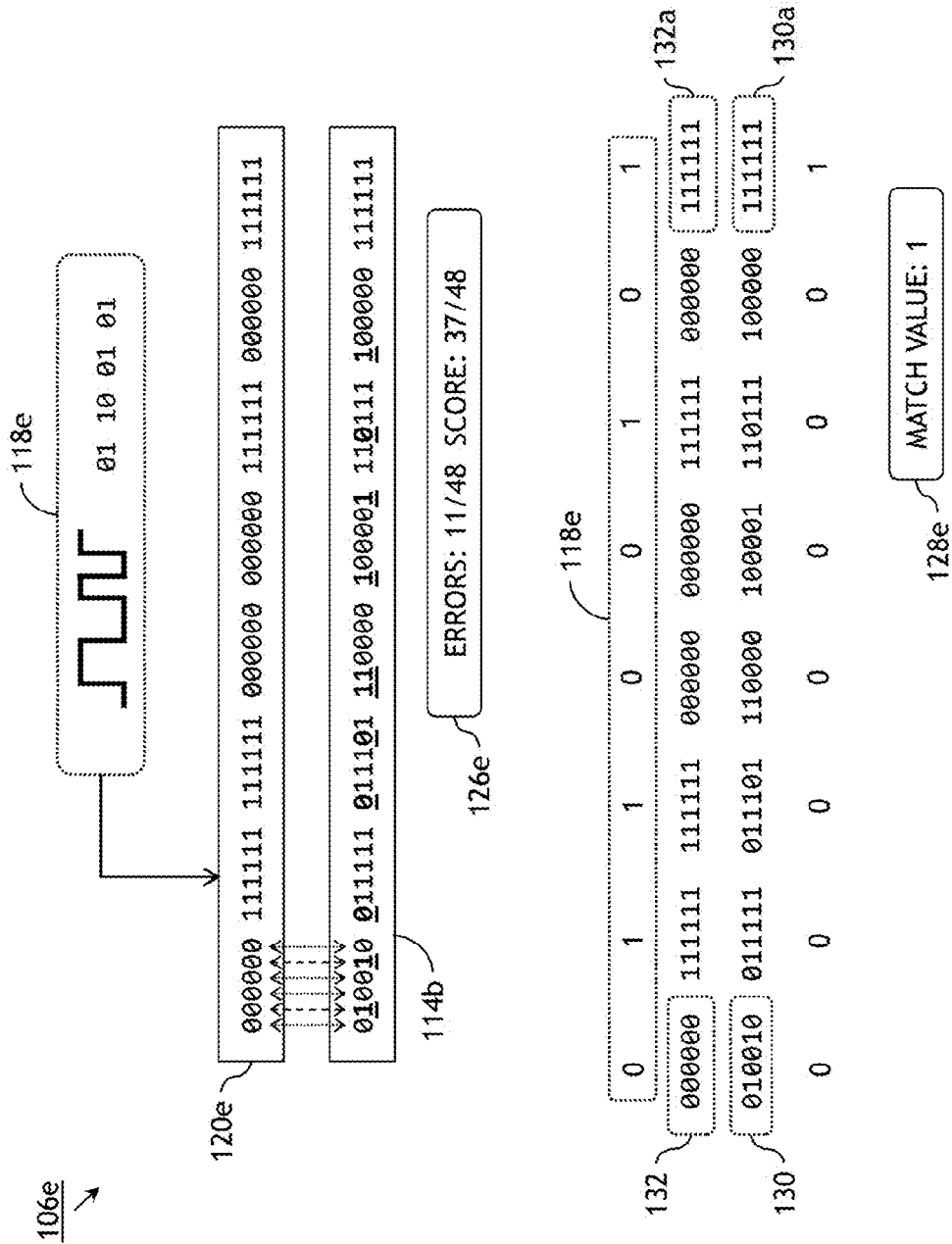
FIG. 3 is a detailed schematic diagram of a sample correlator of FIG. 1.

Referring to FIG. 3, the sample correlator 106e of FIG. 2 may generate a bitwise match value 126e and a symbolwise match value 128e. For example, the sample correlator 106e may correspond to the possible pattern 118e (pattern 4, 0100/01 10 01 01), which at the 6× oversampled rate becomes the oversampled pattern (120e):
000000 1111111 111111 000000 000000 111111 000000 111111
which the sample correlator 106e may compare to the oversampled string (114b):
010010 011111 011101 110000 100001 110111 100000 111111
received from the sampler 104. The summation module (124e, FIG. 2) may track each error (e.g., each bit of the oversampled string 114b that does not precisely match its counterpart bit of the oversampled pattern 120e) or, in the alternative, each bit of the oversampled string 114b that matches its counterpart bit of the oversampled pattern 120e. The result (e.g., 11/48 errors, 37/48 matching bits) may be forwarded to the magnitude module (108, FIG. 2) as a bitwise match value 126e. The summation module 124e may also match the oversampled string 114b to the oversampled pattern 120e on a symbol-by-symbol basis. For example, the oversampled pattern 120e corresponds to the possible pattern 118e for the 4-bit encoded data stream (114a, FIG. 2) 0100, or to its eight-symbol counterpart 01 10 01 01. Accordingly, the sample correlator 106e may break the 48-symbol oversampled string 114b into eight groups of six symbols apiece. Each group (130) may be compared bitwise to a counterpart group (132) of the oversampled pattern 120e, each counterpart group 132 corresponding to a single symbol of the possible pattern 118e. The resulting symbolwise match value 128e may be passed to the magnitude module 108 as an additional basis for assessing each possible pattern 118a-118p as a match for the encoded data string 114a. For example, only a single group (130a) may precisely match, bit for bit, its counterpart group 132a of the oversampled pattern 120a, resulting in a symbolwise match value 128e of 1 (of a possible 8, representing a perfect match).

Referring also to FIG. 2, the bitwise match value 126e and symbolwise match value 128e may be forwarded to the magnitude module 108, along with bitwise match values (126a-126p) and symbolwise match values (128a-128p) from each sample correlator 106a-106p. Based on the set of bitwise and symbolwise match values, the magnitude module 108 may determine which possible pattern 118a-118p provides the closest match to the 4-bit encoded data string 114a and instruct the position module 110 to output the corresponding correlated and decoded binary data string 116.

For example, as noted above the sample correlator 106e may forward to the magnitude module 108 a bitwise match value (126e) of 37/48 matching bits and a symbolwise match value (128e) of 1/8 matching symbols. The magnitude module 108 may compare the received match values 126a-126p, 128a-128p from every sample correlator 106a-106p and determine that the bitwise match value 126e is the highest received bitwise match value (and thus the closest match). In some embodiments, if more than one sample correlator 106a-106p provides a high bitwise match value (126a-126p), a comparison of symbolwise match values 128a-128p may be utilized to determine which sample correlator 106a-106p, and which possible pattern 118a-118p, best matches the encoded data string 114a. The magnitude module 108 may determine that the sample correlator 106e, and its corresponding possible pattern 114e, best matches the 4-bit encoded data string 114a, and instruct the position module to output (116) the corresponding correlated/decoded binary data string 116 (e.g., 0100) for use or display by onboard systems 112.

Figure 4:
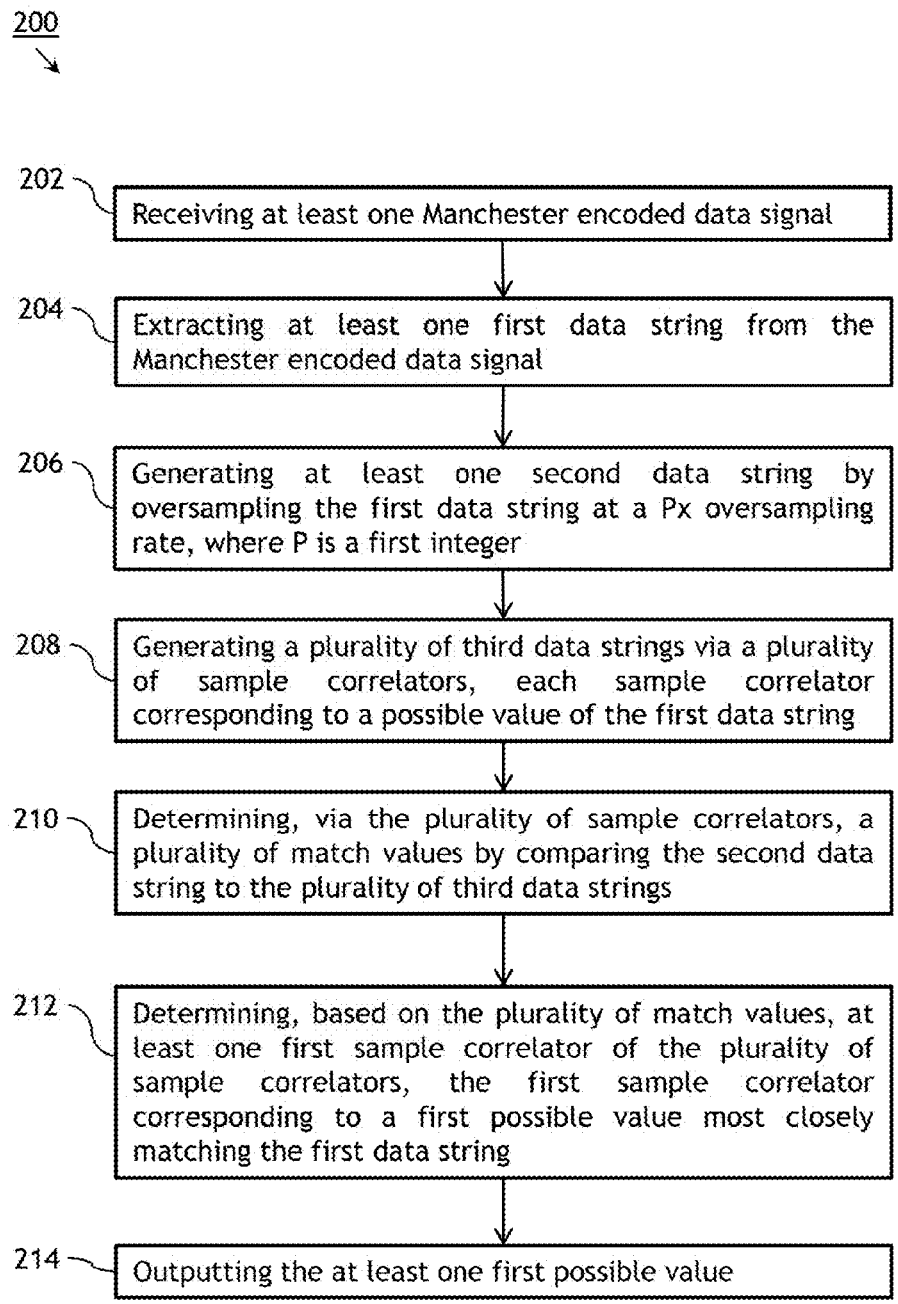
FIG. 4 is a flow diagram illustrating an exemplary embodiment of a method in accordance with the inventive concepts disclosed herein.

Referring to FIG. 4, an exemplary embodiment of a method 200 according to the inventive concepts disclosed herein may be implemented by the system 100 of FIG. 1 and may include the following method steps. At a step 202, the receiver 102 of the system 100 may receive one or more Manchester encoded data signals (114). For example, the receiver 102 may scan for and receive a 1090 MHz ES signal, a Mode-S transponder signal, or an ADS-B signal (e.g., ADS-B Out, ADS-B In, FIS-B, TIS-B).

At a step 204, the sampler 104 of the system 100 may extract one or more data strings (114a) from the Manchester encoded data signal.

At a step 206, the sampler 104 may generate an oversampled string 114b by oversampling the extracted data string 114a at a 6× oversampling rate (or a Px oversampling rate for some integer P). For example, if the extracted data string is an N-bit (e.g., 4-bit) encoded string corresponding to a 2N-symbol string (e.g., 8-symbol, each symbol XY representing a midpoint state transition from X to Y), the sampler 104 may generate a 2NP-symbol (e.g., 2*4*6=48-symbol, where 6× is the oversampling rate) oversampled string 114b.

At a step 208, the sample correlators 106a-106p, each sample correlator corresponding to a possible pattern 118a-118p of the extracted data string 114a, generate oversampled patterns 120a-120p reflecting the same oversampling rate as the oversampled string 114b. For example, each sample correlator 106a-106p may generate a 2NP-symbol oversampled pattern 120a-120p similar to the 2NP-symbol oversampled string 114b by oversampling the 2N-symbol pattern at the Px oversampling rate, e.g., generating a 48-symbol oversampled pattern by repeating each of the 8 symbols 6 times.

At a step 210, the sample correlators 106a-106p determine a set of match values 126a-126p by comparing their respective oversampled patterns 120a-120p to the oversampled string 114b. For example, each sample correlator 106a-106p may determine a bitwise match value 126a-126p of at most 2NP (e.g., 48, for a 48-symbol oversampled string 114b) by comparing each bit of the oversampled string 114b to its corresponding oversampled pattern 120a-120p. Each sample correlator may determine a symbolwise match value 128a-128p by dividing the oversampled string 114b into 2N groups of P symbols each (e.g., dividing the 48-symbol oversampled string into 8 groups of 6 symbols each), each group corresponding to one of the 2N symbols of the possible pattern 118a-118p assigned to that sample correlator 106a-106p. The symbolwise match value 128a-128p of at least 2N (e.g., 8, where the oversampled string 114b is divided into 8 groups) may correspond to the number of groups in which each symbol of the oversampled string 114b matches its counterpart symbol of the oversampled pattern 120a-120p.

At a step 212, the magnitude module 108 determines, based on the set of bitwise and symbolwise match values 126a-126p and 128a-128p, which sample correlator 106a-106p corresponds to the possible pattern 118a-118p most closely matching the extracted data string 114a.

At a step 214, the position module 110 outputs the correlated and decoded data string 116 corresponding to the matching possible pattern 118a-118p of the selected sample correlator 106a-106p.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

I claim:

1. A system for receiving and correlating Manchester encoded data streams, comprising:
    at least one antenna element configured to receive at least one Manchester encoded data (MED) signal; and
    at least one RF module coupled to the antenna element, the RF module comprising:
        at least one sampler configured to:
            extract at least one first data string from the MED signal; and
            generate at least one second data string by oversampling the first data string at a Px oversampling rate, where P is a first integer;
        a plurality of sample correlators, each sample correlator corresponding to a possible value of the first data string and configured to:
            generate at least one third data string by oversampling the possible value at the Px oversampling rate; and
            determine at least one match value by comparing the second data string and the third data string;
    the at least one RF module configured to:
        determine, based on the at least one match value, at least one first sample correlator of the plurality of sample correlators, the first sample correlator corresponding to a first possible value of the plurality of possible values, the first possible value most closely matching the first data string; and
        output the at least one first possible value.

2. The system of claim 1, wherein:
    the at least one first data string includes N encoded bits and 2*N first symbols, where N is a second integer;
    the plurality of sample correlators includes $2^N$ sample correlators;
    the at least one second data string includes 2*N second symbols; and
    the at least one third data string includes 2*N*P third symbols generated by repeating P times each of the at least one first symbol of the possible value of the first data string.

3. The system of claim 2, wherein N is at least 4 and P is at least 6.

4. The system of claim 2, wherein the at least one match value includes:
    a first match value of at most 2*N*P, the first match value corresponding to a number of the one or more second symbols of the second data string matching the corresponding third symbol of the third data string.

5. The system of claim 2, wherein:
    each sample correlator is configured to divide the second data string into 2*N groups, each group including P second symbols; and
    the at least one match value includes a second match value of at most 2*N and corresponding to the number of groups of the second data string in which each of the P second symbols matches the corresponding third symbol of the third data string.

6. The system of claim 1, wherein the at least one MED signal includes at least one of a 1090 MHz extended squitter (ES) signal, a Mode-S transponder signal, and an ADS-B signal.

7. An apparatus for receiving and correlating Manchester encoded data, comprising:
    at least one antenna element configured to receive at least one Manchester encoded data signal; and
    at least one RF module coupled to the antenna element, the RF module comprising:
        at least one sampler configured to
            extract at least one first data string from the Manchester encoded data signal; and
            generate at least one second data string by oversampling the first data string at a Px oversampling rate, where P is a first integer;
        a plurality of sample correlators, each sample correlator corresponding to a possible pattern of the first data string and configured to:
            receive the second data string;

generate at least one third data string by oversampling the possible pattern at the Px oversampling rate;
determine at least one match value by comparing the second data string and the third data string;
the at least one RF module configured to:
determine at least one first sample correlator of the plurality of sample correlators based on the at least one match value, the first sample correlator corresponding to a first possible pattern of the plurality of possible patterns, the first possible pattern most closely matching the first data string; and
output the at least one first possible pattern.

8. The apparatus of claim 7, wherein:
the at least one first data string includes N encoded bits and 2*N first symbols, where N is a second integer;
the at least one second data string includes 2*N second symbols; and
the at least one third data string includes 2*N*P third symbols generated by repeating P times each of the at least one first symbol of the possible value of the first data string.

9. The apparatus of claim 8, wherein N is at least 4 and P is at least 6.

10. The apparatus of claim 8, wherein the at least one match value includes:
a first match value of at most 2*N*P, the first match value corresponding to a number of the one or more second symbols of the second data string matching the corresponding third symbol of the third data string.

11. The apparatus of claim 8, wherein:
each sample correlator is configured to divide the second data string into 2*N groups, each group including P second symbols; and
the at least one match value includes a second match value of at most 2*N and corresponding to the number of groups of the second data string in which each of the P second symbols matches the corresponding third symbol of the third data string.

12. The apparatus of claim 7, wherein the at least one MED signal includes at least one of a 1090 MHz extended squitter (ES) signal, a Mode-S transponder signal, and an ADS-B signal.

13. The apparatus of claim 7, wherein:
the apparatus is embodied aboard at least one of a manned aircraft and an unmanned aircraft system (UAS); and
the at least one RF module is configured to output the at least one first possible pattern to one or more onboard control systems associated with at least one of the manned aircraft and the UAS.

14. A method for correlating Manchester encoded data, comprising:
receiving at least one Manchester encoded data (MED) signal;
extracting at least one first data string from the MED signal;
generating at least one second data string by oversampling the first data string at a Px oversampling rate, where P is a first integer;
generating a plurality of third data strings via a plurality of sample correlators, each sample correlator corresponding to a possible value of the first data string;
determining, via the plurality of sample correlators, a plurality of match values by comparing the second data string to the plurality of third data strings;
determining, based on the plurality of match values, at least one first sample correlator of the plurality of sample correlators, the first sample correlator corresponding to a first possible value of the plurality of possible values, the first possible value most closely matching the first data string; and
outputting the at least one first possible value.

15. The method of claim 14, wherein receiving at least one Manchester encoded data (MED) signal includes:
receiving at least one of a 1090 MHz extended squitter (ES) signal, a Mode-S transponder signal, and an ADS-B signal.

16. The method of claim 14, wherein generating at least one second data string by oversampling the first data string at a Px oversampling rate, where P is a first integer includes:
generating at least one second data string having 2*N*P first symbols by oversampling the first data string of 2*N second symbols at a Px oversampling rate, where N is a second integer.

17. The method of claim 16, wherein generating at least one second data string having 2*N*P first symbols by oversampling the first data string of 2*N second symbols at a Px oversampling rate, where N is a second integer includes:
generating at least one second data string having 48 first symbols by oversampling the first data string of 8 second symbols at a 6× oversampling rate.

18. The method of claim 16, wherein generating a plurality of third data strings via a plurality of sample correlators, each sample correlator corresponding to a possible value of the first data string includes:
generating a plurality of third data strings having 2*N*P third symbols via a plurality of sample correlators by oversampling each of a plurality of possible values of the first data string at the Px oversampling rate.

19. The method of claim 18, wherein determining, via the plurality of sample correlators, a plurality of match values by comparing the second data string to the plurality of third data strings includes:
determining a plurality of first match values, each first match value of at most 2*N*P and corresponding to a number of the one or more first symbols of the second data string matching the corresponding third symbol of the third data string.

20. The method of claim 18, wherein determining, via the plurality of sample correlators, a plurality of match values by comparing the second data string to the plurality of third data strings includes:
dividing, via the plurality of sample correlators, the second data string into 2*N groups, each group including P first symbols; and
determining a plurality of second match values, each second match value of at most 2*N and corresponding to the number of groups of the second data string in which each of the P first symbols matches the corresponding third symbol of the third data string.

* * * * *